(12) United States Patent
Curotto (10) Patent No.: US 8,674,243 B2
(45) Date of Patent: *Mar. 18, 2014

(54) AUTOMATED SIDE LOADING COLLECTION AND SCALE SYSTEM

(75) Inventor: John Michael Curotto, Sonoma, CA (US)

(73) Assignee: The Curotto-Can, LLC, Chattanooga, TN (US)

(*) Notice: Subject to any disclaimer, the term of this patent is extended or adjusted under 35 U.S.C. 154(b) by 724 days.

This patent is subject to a terminal disclaimer.

(21) Appl. No.: 12/708,705

(22) Filed: Feb. 19, 2010

(65) Prior Publication Data

US 2010/0206642 A1 Aug. 19, 2010

Related U.S. Application Data

(60) Provisional application No. 61/144,989, filed on Jan. 15, 2009, provisional application No. 61/153,845, filed on Feb. 19, 2009.

(51) Int. Cl.
*G01G 19/00* (2006.01)
(52) U.S. Cl.
USPC ........... 177/136; 177/245; 177/141; 700/305; 340/666; 702/173; 705/308; 705/414
(58) Field of Classification Search
USPC ........... 177/136, 141, 245; 700/305; 702/173, 702/174; 705/414, 308; 340/666
See application file for complete search history.

(56) References Cited

U.S. PATENT DOCUMENTS

| | | | | |
|---|---|---|---|---|
| 2,069,499 A * | 2/1937 | Marin et al. | | 177/238 |
| 3,321,036 A * | 5/1967 | Keenan et al. | | 177/245 |
| 5,119,894 A * | 6/1992 | Crawford et al. | | 177/145 |
| 5,209,312 A * | 5/1993 | Jensen | | 177/136 |
| 5,230,393 A * | 7/1993 | Mezey | | 177/139 |
| 5,565,846 A * | 10/1996 | Geiszler et al. | | 340/572.2 |
| 5,641,947 A * | 6/1997 | Riddle, Jr. | | 177/126 |
| 5,837,945 A * | 11/1998 | Cornwell et al. | | 177/136 |
| 6,191,691 B1 * | 2/2001 | Serrault | | 340/572.8 |
| 6,687,656 B2 * | 2/2004 | Durbin et al. | | 702/188 |
| 7,146,294 B1 * | 12/2006 | Waitkus, Jr. | | 702/188 |
| 7,151,231 B2 * | 12/2006 | Kamakau | | 177/126 |
| 7,737,372 B2 * | 6/2010 | Dougherty et al. | | 177/245 |
| 7,897,884 B2 * | 3/2011 | Harish | | 177/25.13 |
| 8,330,059 B2 * | 12/2012 | Curotto | | 177/136 |
| 2006/0127202 A1 * | 6/2006 | Tryggvason | | 414/21 |
| 2007/0278019 A1 * | 12/2007 | Santi et al. | | 177/136 |
| 2010/0179912 A1 * | 7/2010 | Curotto | | 705/308 |

OTHER PUBLICATIONS

Curotto Scale System Project, Dec. 1, 2008, 12 pages.

* cited by examiner

*Primary Examiner* — Randy W Gibson
(74) *Attorney, Agent, or Firm* — Merchant & Gould P.C.

(57) ABSTRACT

The disclosure describes a novel approach of utilizing a collection bin for a side loading waste collection vehicle. The collection bin includes a weighing system with a processor for measuring the weight of material collected from each waste container and associating this weight with appropriate data, such as the owner of the waste container.

18 Claims, 8 Drawing Sheets

AUTOMATED SIDE LOADING COLLECTION AND SCALE SYSTEM

RELATED APPLICATIONS

This application claims the benefit of U.S. Provisional Application No. 61/144,989, filed Jan. 15, 2009, and entitled, "Automated Collection and Scale System", which application is hereby incorporated herein by reference. Further, this application claims the benefit of U.S. Provisional Application No. 61/153,845, filed Feb. 19, 2009, and entitled, "Automated Collection and Scale System", which application is hereby incorporated herein by reference. Additionally, this application is related to U.S. patent application Ser. No. 12/688,660 filed Jan. 15, 2010, and entitled, "Automated Collection and Scale System".

INTRODUCTION

Several types of waste collection vehicles exist. Waste collection vehicles can be front loaders, rear loaders, side loaders, automated side loaders, and grapple trucks. Waste collection vehicles are typically utilized to pick up quantities of waste for hauling to a determined area, such as a landfill, transfer station, or material recovery facility. Waste collection vehicles can be further utilized or modified to collect recyclables for transport to a recycling facility.

The allocation of waste removal equipment has been improved by the use of large trucks having compaction capabilities extending their effective range and capacity between unloadings. Further, the vehicles may include specialized hoists to lift trash containers into the truck.

As the amount of solid waste, such as municipal solid waste, generated in the United States increases and landfill capacity diminishes, efficient recycling becomes of critical importance. In many communities, recyclable waste amounts to 60-70% of the total waste collected.

SUMMARY

The disclosure describes a novel approach of utilizing a collection bin for a side loading waste collection vehicle. The collection bin includes a weighing system with a processor for measuring the weight of material collected from each waste container and associating this weight with appropriate data, such as the owner of the waste container.

In part, this disclosure describes a method for weighing materials in a collection bin for a side loading waste collection vehicle. The method includes performing the following steps:
 a) identifies a waste container;
 b) moving materials stored in the identified waste container to a collection bin;
 c) determining that the materials have been received by the collection bin;
 d) weighing the materials in the collection bin to produce a weight measurement with an accuracy of within about 5 pounds or less; and
 e) utilizing a processor to associate the weight measurement with the identified waste container.

In another aspect, this disclosure describes a collection bin that includes: at least one suspension mechanism for attachment to a side loading waste collection vehicle; a processor; and a weighing instrument controlled by the processor, the weighing instrument is adapted to weigh material disposed in the collection bin to produce weight measurements. The processor associates the weight measurements with appropriate data.

Yet another aspect of this disclosure describes a collection and scale system that includes: a side loading waste collection vehicle; a collection bin; and a weighing system. The collection bin includes a suspension mechanism for attachment to the side loading waste collection vehicle. The weighing system is adapted to weigh material disposed in the collection bin to produce weight measurements. The weighing system includes: at least one weighing instrument and a processor. The processor associates the weight measurements with appropriate data.

These and various other features as well as advantages will be apparent from a reading of the following detailed description and a review of the associated drawings. Additional features are set forth in the description that follows and, in part, will be apparent from the description, or may be learned by practice of the described embodiments. The benefits and features will be realized and attained by the structure particularly pointed out in the written description and claims hereof as well as the appended drawings.

It is to be understood that both the foregoing general description and the following detailed description are exemplary and explanatory and are intended to provide further explanation of the claimed invention.

DETAILED DESCRIPTION

Although the techniques introduced above and discussed in detail below may be implemented in a variety of collection vehicles, the present disclosure will discuss the implementation of these techniques in the context of a collection vehicle for use in providing removal and transport of recyclables. The reader will understand that the technology described in the context of a scaling system for a collection vehicle could be adapted for use with other systems or vehicles.

Collection vehicles are used to provide removal and transport of items such as municipal solid waste, recyclables, dirt, rock, coal, minerals, green waste (e.g. yard waste), and/or any other material commonly collected and transported. While operating a collection vehicle, it is desirable to monitor the amount of materials collected. Accordingly, a collection vehicle with a scale system is desirable.

A collection and scale system (CS system) includes a suspended collection bin, a weighing system, and a side loading waste collection vehicle. In one embodiment, the CS system further utilizes an automated robotic arm. The CS system may provide accurate weight measurements of within 5 pounds (2.268 kilograms) or less of collected materials per waste container, per filled suspended collection bin, per customer, and/or per route. In an alternative embodiment, the CS system may provide accurate weight measurements of within 0.5 pounds (0.2268 kilograms) or less of collected materials per waste container, per filled suspended collection bin, per customer, and/or per route. The CS system may provide accurate weight measurements of within 0.5 pounds (0.227 kilograms) or less of collected materials per waste container, per filled collection bin, per customer, and/or per route. The CS system may provide accurate weight measurements of within 0.1 pounds (0.0454 kilograms) or less of collected materials per waste container, per filled collection bin, per customer, and/or per route. Additionally, the CS system may provide an accurate weight of the materials collected in total by the weight collection vehicle. Further, the design of the CS system allows for identification and removal of undesirable/improper materials from the collection bin and for weight recalculation after the removal of undesirable materials from the collection bin.

A variety of examples of desirable product features or methods are set forth in part in the description that follows, and in part will be apparent from the description, or may be learned by practicing various aspects of the disclosure. The aspects of the disclosure may relate to individual features as well as combinations of features. It is to be understood that both the foregoing general description and the following detailed description are explanatory only, and are not restrictive of the scope of the equipment and methods described herein.

Reference will now be made in detail to various features of the present disclosure that are illustrated in the accompanying drawings. Wherever possible, the same reference numbers will be used throughout the drawings to refer to the same or like parts.

Figure 1:
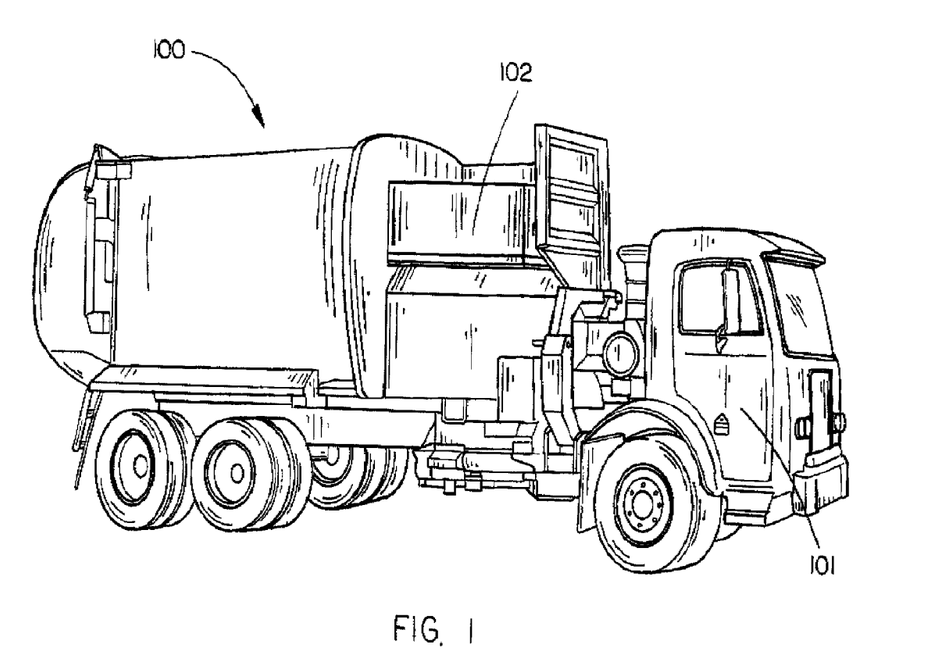
FIG. 1 is a side view of one embodiment of a collection and scale system according to the principles of the present disclosure.
Figure 2:
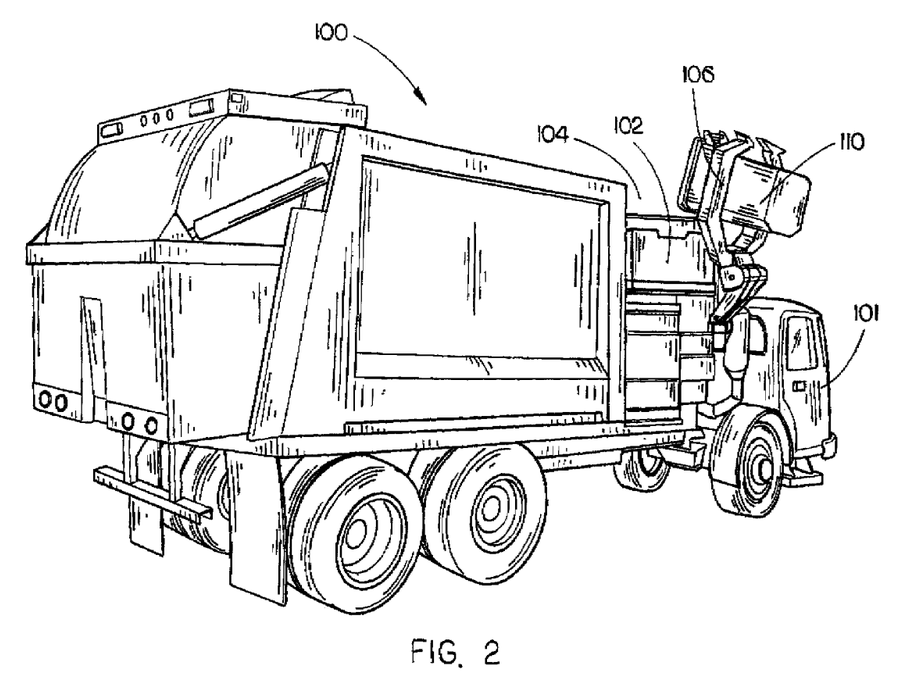
FIG. 2 is a rear perspective view of one embodiment of a collection and scale system according to the principles of the present disclosure.

FIGS. 1 and 2 illustrate embodiments of a collection and scale system (CS system) 100. The CS system 100 utilizes a side loading waste collection vehicle 101, a suspended collection bin 102, and a weighing system. In one embodiment, the CS system 100 further utilizes an automated robotic arm 106. The CS system 100 may provide accurate weight measurements of within 5 pounds (2.268 kilograms) or less of the materials contained within each waste bin, discarded per customer, filled in the suspended collection bin 102, and collected over an entire route, collected in total per truck, or collected in total by selected waste collection vehicles in any desired amount of time. In another embodiment, the CS system 100 may provide accurate weight measurements of within 0.5 pounds (0.2268 kilograms) or less of the materials contained within each waste bin, discarded per customer, filled in the suspended collection bin 102, and collected over an entire route, collected in total per truck, or collected in total by selected waste collection vehicles in any desired amount of time. The CS system 100 may provide accurate weight measurements of within 0.1 pounds (0.0454 kilograms) or less of the materials contained within each waste container, discarded per customer, filled in the collection bin 102, and collected over an entire route, collected in total per truck, or collected in total by selected waste collection vehicles in any desired amount of time. The materials collected may be waste, such as municipal solid waste, recyclables, dirt, rock, coal, minerals, green waste (e.g. yard waste), or any other material commonly collected and transported. As utilized herein, the term "recyclables" is not limiting and is understood to be interchangeable with any material that is commonly collected and transported.

In an alternative embodiment, the CS system 100 utilizes a front loading waste collection vehicle, a collection bin, and a weighing system. The front loading waste collection vehicle may utilize a fork and hold the collection bin by inserting the fork into pockets located on the collection bin. The fork may lift the collection bin and dump materials collected in the collection bin into the hopper of the front loading waste collection vehicle. Further, this embodiment may further utilize an automated robotic arm 106 for lifting of non-commercial waste containers.

As the amount of solid waste generated in the United States increases and landfill capacity diminishes, efficient recycling becomes of critical importance. As recycling increases in importance, so does the system for collecting and transporting recyclables. In some areas, in order to encourage individuals to recycle, incentive programs have developed that provide each consumer with rewards based on the amount of recycling he or she does. The CS system 100 is an ideal tool for collecting recyclables that allows for accurate determinations of recycling amounts per customer, household, or area. Further, current collection and transport vehicles charge by volume regardless of the amount of materials collected. The collection and scale system (CS system) 100 provides the operator with the option to charge by weight of the material collected.

As illustrated, the side loading waste collection vehicle (WCV) 101 utilizes a vehicle, a hopper, and a loading area 104. In one embodiment, the hopper may include a packing blade. The loading area 104 is located on the side of the hopper. The loading area 104 is the area where the collected materials are dumped into the hopper.

Side loading WCVs 101 are typically designed for the automated lifting of non-commercial, residential, or smaller sized waste containers 110, such as toters. Smaller sized waste containers 110 often hold from about 25 gallons (about 94.64 liters) to about 400 gallons (about 1514 liters) of material.

The suspended collection bin 102 (or intermediate bin) of the CS system 100 is suspended in, above, and/or beside the loading area 104. The location of the suspended collection bin 102 requires that all collected materials are placed in the suspended collection bin 102 prior to entering the packing area of the hopper. In one embodiment, the suspended collection bin 102 has a trap door that opens allowing the collected materials to enter the hopper. In another embodiment, the collection bin 102 dumps the collected materials into the hopper. In one embodiment, collection bin has at least two doors that open to allow the collected material to enter the hopper. In one embodiment, the door(s) is made from at least one of metal, plastic, and fabric. This list is not limiting. Any suitable material for the door(s) of the collection bin 102 for allowing the release of material from the collection bin 102 into the hopper may be utilized.

In another embodiment, the collection bin 102 may pivot or turn upside down in order to unload the material stored in the collection bin 102 into the packing area of the hopper. In one embodiment, the collection bin rotates on at least one hinge in order to dump the material stored in the collection bin 102 into the packing area of the hopper. The suspended collection bin 102 may be manually operated or automated. The suspended collection bin 102 is referred to as automated when the lifting and/or dumping of the collected materials from the suspended collection bin 102 into the hopper is performed automatically upon the initiation of the actions by an operator command.

In one embodiment, the suspended collection bin 102 is powered by utilizing systems already implemented on the side loading WCV 101, such as a power system, a hydraulic system, or a pneumatic system. The collection bin 102 may be suspended by any suitable equipment or suspension mechanism for maintaining the collection bin 102 above, in, and/or beside the loading area 104 for receiving, weighing, and identifying of collected materials. In one embodiment, the suspended collection bin 102 may include pockets on the bottom of the suspended collection bin 102 to facilitate the suspension. The suspended collection bin 102 allows any side loading WCV 101 to be adapted to weigh collected materials and associate the weight of collected materials with specific information.

In one embodiment, the suspended collection bin 102 is permanently attached to the loading area 104 of the side loading WCV 101. The suspended collection bin 102 may be attached to loading area 104 by any suitable method, such as welding, bolting, chaining, bracketing, or soldering. In another embodiment, the suspended collection bin 102 is removable from the loading area 104 of the side loading WCV 101. The suspended collection bin 102 may be made of any suitable material for holding waste, recyclables or collectable materials, such as plastic, metal, woven material, fabric and/or fiberglass. In another embodiment, the suspended collection bin 102 is designed to hold about 1 cubic yard (about 0.7646 cubic meters) to about 10 cubic yards (about 7.646 cubic meters) of material. In a further embodiment, the suspended collection bin 102 is designed to hold about 3 cubic yards (about 2.294 cubic meters) to about 5 cubic yards (about 3.823 cubic meters) of material.

Figure 6:
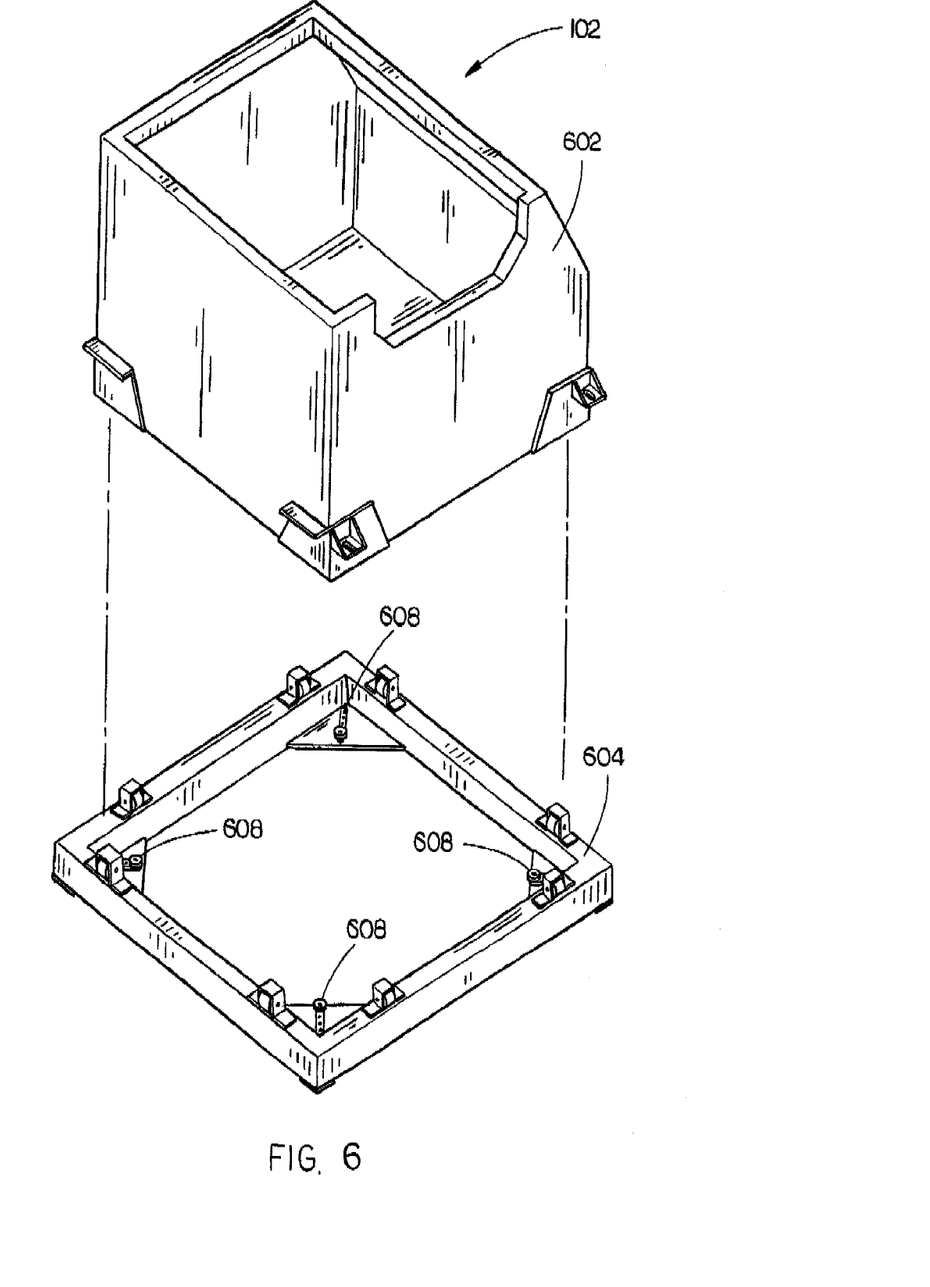
FIG. 6 illustrates an exploded view of one embodiment of a collection bin.

In one embodiment, the collection bin 102 is a solitary structure. In an alternative embodiment, the collection bin 102 is structured in multiple parts. In one embodiment, the collection bin 102 has substantially two parts. In another embodiment, these two parts are a frame 604 and a tub 602 attached to the frame 604, as illustrated in FIG. 6. As used herein the tub 602 is any suitable container or holder for holding and/or collecting materials. The frame 604 as used herein is any suitable device for allowing the tub 602 to be held by and/or attached to the side loading waste collection vehicle. In one aspect of this embodiment, the two structures may be inseparable once combined. In another aspect of this embodiment, the two structures may be separable from each other even after combination.

In one embodiment, the frame 604 includes at least one pocket. In another embodiment, two pockets are on the frame of the collection bin 102. In yet another embodiment, a robotic arm 106 is attached to the frame 604 of the collection bin 102. The frame 604 allows for one or multiple load cells 608 to be utilized for measuring the weight of the tub 602 and materials located in the tub 602, such as two load cells 608, three load cells 608, four load cells 608, six load cells 608, and eight load cells 608.

In one embodiment, four load cells 608 are positioned near the corners of the tub 602 on the frame 604. The positioning of the load cells 608 underneath the tub 602 near each corner provide for a level and/or stable weighing surface, as illustrated in FIG. 6. This level and/or stable weighing surface provides for a desirable accuracy measurement, such as accuracy of within about 5 pounds or less, within about 1 pound or less, within about 0.5 pounds or less, and within about 0.1 pounds or less.

Further, the utilization of an intermediate or collection bin 102 allows for better accuracy compared to waste collection vehicles with arm mounted weighing units. Waste collection vehicles with hopper weighing units have to account for extremely large weights totaling up to as much as 40,000 pounds. These large weights drastically decrease the sensitivity and accuracy of the weighing instruments of the hopper. The collection bin 102 does not need to be capable of weighing such large weights allowing for more desirable accuracy of within about 5 pounds or less, within about 1 pound or less, within about 0.5 pounds or less, and within about 0.1 pounds or less.

In one embodiment, the waste containers 110 are manually lifted and emptied into the suspended collection bin 102. In an additional embodiment, the CS system 100 utilizes a semi-automated system, such as a lifter or a tipper. As used herein the term "semi-automated", refers to a system that is activated by the operator, but requires further manual assistance to function properly, such as attachment of the waste container and/or positioning of the waste. In another embodiment, the CS system 100 utilizes an automated robotic arm 106 attached to the side loading WCV 101, as illustrated in FIG. 2. The robotic arm 106 is referred to as automated because the grabbing, lifting, dumping, and setting down of the waste container 110 by the robotic arm 106 may be performed automatically upon the initiation of the actions by an operator command.

The automated robotic arm 106 may be any suitable robotic arm 106 for the automated grabbing, lifting, and emptying of waste containers 110. The automated robotic arm 106 may be made of any suitable materials for the automated grabbing, lifting, and emptying of waste containers 110, such as plastic, metal, and/or rubber. In one embodiment, the robotic arm 106 may be similar to or the same as the type disclosed in U.S. Pat. No. 7,210,890 filed on Oct. 16, 2003. In one embodiment, the automated robotic arm 106 is powered by utilizing systems already implemented on the side loading WCV 101, such as power, a hydraulic system, or a pneumatic system. In another embodiment, the automated robotic arm 106 is suitable for evenly spreading material dumped from the waste containers 110 in the suspended collection bin 102. In a further embodiment, the automated robotic arm 106 of the side loading WCV 101 is capable of grabbing a waste container 110, picking up and dumping the waste container 110 into the suspended collection bin 102, placing the waste container 110 back on the ground, and releasing the waste container 110 in a time frame of less than 6 seconds. In an additional embodiment, the automated robotic arm 106 grabs, lifts and disposes of any type/shape of waste container 110 or any bulky item, such as furniture, appliances, barrels, or crates. In one embodiment, the automated robotic arm 106 picks up waste containers 110 ranging in size from about 30 gallons (about 113.6 liters) to about 400 gallons (about 1514 liters), as illustrated in FIG. 2.

If unwanted materials are disposed in the suspended collection bin 102, the operators can exit the vehicle and remove the unwanted items from the suspended collection bin 102. In one embodiment, a camera may record and send to a display all of the items collected in the suspended collection bin 102 as they are collected or in real time. The operator of the side loading waste collection vehicle 101 may view the items collected in the suspended collection bin 102 by visually inspecting the suspended collection bin 102 or by watching a display from a video or camera recording the collected materials. The viewing of the materials may be performed during standard operation and allows materials to be removed prior to entering the hopper of the side loading WCV 101. In an embodiment, a ladder may be attached to the side loading vehicle to allow an operator to climb up to the suspended collection bin 102 for the removal of undesirable materials. In one embodiment, the hopper of the side loading WCV 101 utilizes a packing blade to compact the collected materials.

Because of the packer blade, it is undesirable to manually remove items from the collected materials in the hopper. The suspended collection bin 102, allows undesirable items to be viewed and/or removed before being placed in the hopper.

The CS system 100 further comprises a weighing system. In one embodiment, the weighing system utilizes a weighing instrument to determine weight measurements. In one embodiment, the weighing instrument includes at least one load cell. In another embodiment, the load is a transducer that utilizes a strain gauge.

In one embodiment, the weighing system utilizes power from the side loading waste collection vehicle 101. In another embodiment, the weighing system utilizes power from its own internal power source, such as a battery or solar panel. In a further embodiment, the weighing system is self-contained. As used herein the term "self-contained" refers to a weighing system that has no connections or at most one connection to the side loading waste collection vehicle 101, such as a power supply connection. Self-contained weighing systems provide for interchangeability between WCVs.

In another embodiment, the weighing system includes a monitor. In one embodiment, the monitor may be located on the WCV. In an alternative embodiment, the monitor may be separate from the WCV. The monitor is capable of displaying information to the operator, such as weight measurements for the associated and/or identified waste containers 110.

In one embodiment the weighing system monitors collection activities in real time. As used herein, "real time" refers to the recording and/or storing of weight measurements as they are taken. In one embodiment, the weight measurements and associated data are sent via a wireless card or network to the computing device in real time.

Figure 7:
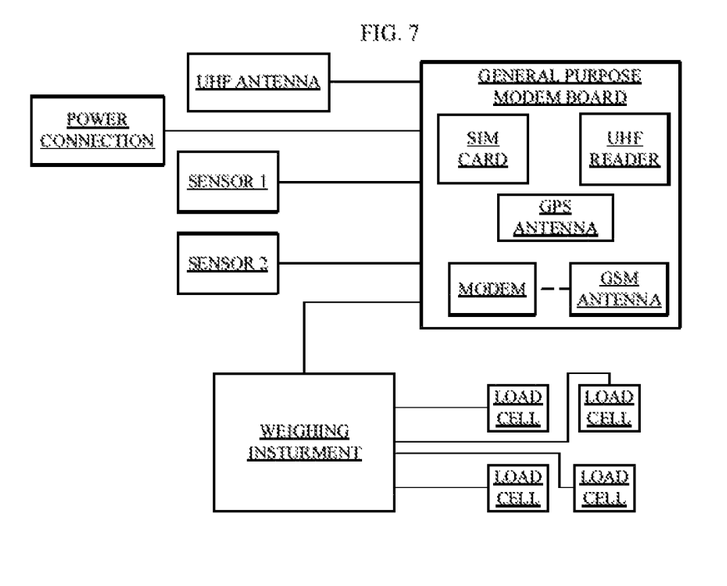
FIG. 7 represents an embodiment of a weighing system.

FIG. 7 illustrates one embodiment of the weighing system. In one embodiment, the weighing system includes two main elements housed in two enclosures: a control system that also handles communications and location functions and a weighing instrument. In this embodiment, the core of the system is the General Purpose Modem board (GPM2) as illustrated in FIG. 7. The GPM2 includes a modem with Global Positioning System (GPS) and Global Packet Radio Service (GPRS) capability and an ultra high frequency reader. In an alternative embodiment, a low frequency RFID system is utilized. The GPM2 receives input from at least one sensor and takes power and ignition input. In one embodiment, the sensor is adapted to sense movement. In another embodiment, the sensor is adapted to determine a change in weight. Any suitable sensor for determining the receipt of materials into the collection bin may be utilized by the weighing system. In another embodiment, the utilized sensors are standardized and fit easily to side loading waste collection vehicles, robotic arms, and/or collection bins.

In this embodiment, the second main element is the weighing instrument housed in a separate enclosure, such as in the collection bin 102. In one embodiment, the weighing instrument includes four load cells positioned under the collection bin 102 for taking weighing measurements that are transmitted by the GPM2 board. Referring to FIG. 6, which illustrates an exploded view of one embodiment of the collection bin, load cells 608 are shown positioned underneath a tub 602 on the frame 604 of the collection bin 102.

In an embodiment, the ultra high frequency reader of the GPM2 is connected to an ultra high frequency antenna and at least one sensor for determining the start or end of the dumping of a waste container 110 into the collection bin 102. In an alternative embodiment, a low frequency reader of the GPM2 is connected to a low frequency antenna and at least one sensor for determining the start or end of the dumping of a waste container 110 into the collection bin 102.

In another embodiment, the GPM2 board includes a Global System for Mobile communications (GSM) including a GSM antenna for receiving GSM frequency bands as further illustrated by FIG. 7. In yet another embodiment, the GPM2 board includes a subscriber identity module (SIM) card. The SIM card allows the GPM2 board to utilize GPRS and short message service (SMS or text). In one embodiment, voice mail should be disabled on the SIM card. Further, in one embodiment, the GPM2 board includes a power connection for receiving power from another component, such as the side loading WCV.

In an embodiment, the load cells take weight measurements at the start and the end of a dump cycle based on sensor information. In an embodiment, the determination of the correct time to take weight measurements is necessary for receiving accurate weight information. In another embodiment, the weighing system records and stores weight measurements every second. Further, during weighing, the amount of movement may be minimized for more accurate readings, such as through accurate sensor readings. In another embodiment, weight measurements taken at the start and end of a full dump cycle or the cycle of grabbing, emptying, and releasing of the waste container 110 are utilized to determine the amount of material collected from each waste container 110. In another embodiment, weights are calculated by measuring the weight of the collection bin prior to the start of the dump cycle and after the end of a full dump cycle to determine the amount of material collected from each waste container 110. In one embodiment, the measurements utilized were taken 1 second prior to the start of the dump cycle and 1 second after the end of the dump cycle. In another embodiment, the measurements utilized were taken 2 seconds prior to the start of the dump cycle and 2 seconds after the end of the dump cycle. In a further embodiment, the amount of time prior to the dump cycle that a measurement is taken is different from the amount of time that passes before measurement after a dump cycle is completed. The weight measurements can be taken at any period prior to or after the dump cycle.

In one embodiment, at least one sensor is placed on the robotic arm to determine the start and end of the dump cycle. In another embodiment, two sensors are placed on the robotic arm 106 to determine the start and end of the dump cycle. In one embodiment, the first sensor is attached to the sliding part of the robotic arm 106. In a further embodiment, the second sensor is attached to the rotating part of the robotic arm 106. In this embodiment, the first sensor determines the start and the end of a waste container 110 dump cycle. Further, in this embodiment, the second sensor determines the dumping of the waste container 110. In one embodiment, the sensors have been shown in various experiments to accurately determine when to record weight measurements. These sensors can determine when to take weight measurements during regular and irregular dump cycles. For instance, the sensors have accurately determined when to record weight measurements if the robotic arm 106 slides out and back in without dumping, performs a normal dump cycle, performs an incomplete dump, performs a dump motion on an already emptied waste container 110, and performs a dump motion without holding a waste container 110.

In one embodiment, a third sensor is utilized. In an embodiment, the third sensor is located on the dumping mechanism utilized by the side loading waist collection vehicle to empty the collection bin 102. In this embodiment, the third sensor determines when the collection bin 102 is dumped into the hopper.

In another embodiment, the weighing system is calibrated before use. For example, the weighing system may undergo a zero and/or span calibration. A zero calibration may include ensuring that the weighing system is at zero when the collection bin 102 is empty and recalibrating the weighing system if not at zero when empty. A span calibration may include placing a known weight, such as 500 pounds, in the collection bin 102 to make sure the weighing system has the correct span. If the weighing system does not measure the correct weight, the weighing system can be calibrated for better accuracy. In a further embodiment, the calibration results are stored in permanent memory for use each time the weighing system is powered up.

The weighing system utilizes at least one computing device for weight determination and association. In one embodiment, the logical operations of the various embodiments are implemented (1) as a sequence of computer implemented steps running on a computing system and/or (2) as interconnected machine modules within the computing system. The implementation is a matter of choice dependent on the performance requirements of the computing system implementing the disclosure. Accordingly, the logical operations making up the embodiments described herein are referred to alternatively as operations, steps or modules.

Figure 4:
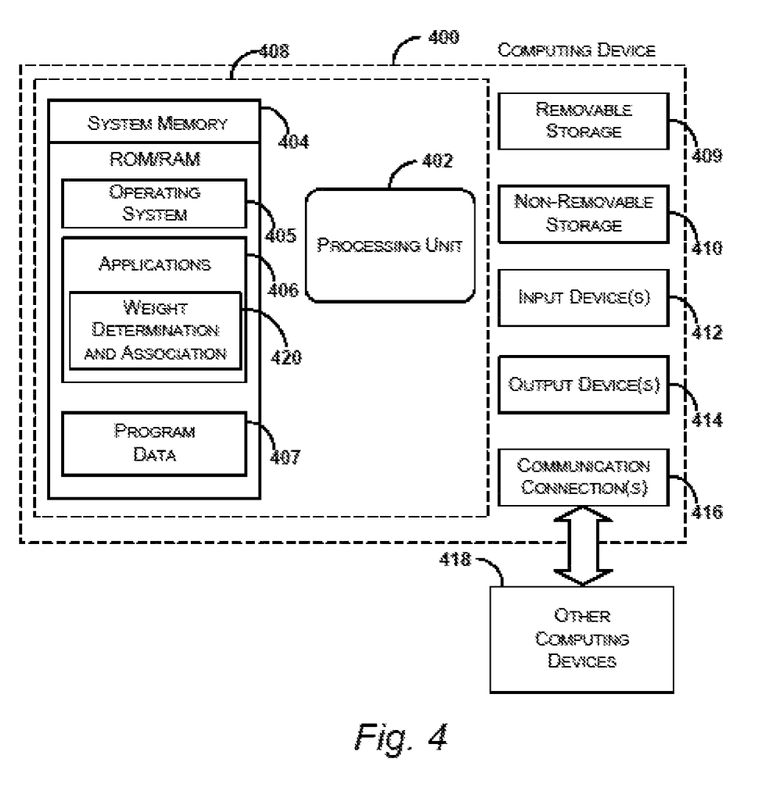
FIG. 4 represents an embodiment of a computing device.

In one embodiment, each side loading WCV 101 utilizes a computing device 400 as illustrated in FIG. 4. In another embodiment, each side loading WCV 101 sends collected data to a computing device 400. In an alternative embodiment, a select number of side loading WCVs 101 utilize a computing device 400.

FIG. 4 represents an embodiment of a computing device for use with a weighing system. In a basic configuration, computing device 400 may include any type of stationary computing device including a vehicle-mounted or handheld mobile computing device. Computing device 400 may include at least one processing unit 402 and system memory 404. Depending on the exact configuration and type of computing device, system memory 404 may be volatile (such as RAM), non-volatile (such as ROM, flash memory, and the like) or some combination of the two. System memory 404 may include operating system 405, one or more executable programs or applications 406, and may include program data 407. In one embodiment, applications 406 further include application 420 for weight determination and association. This basic configuration is illustrated in FIG. 4 by those components within dashed line 408.

Computing device 400 may also have additional features or functionality. For example, computing device 400 may also include additional data storage devices (removable and/or non-removable) such as, for example, magnetic disks, optical disks, or tape. Such additional storage is illustrated in FIG. 4 by removable storage 409 and non-removable storage 410. Non-transitory computer-readable storage mediums may include volatile and non-volatile, removable and non-removable media implemented in any method or technology for storage of information, such as non-transitory computer readable instructions, data structures, program modules or other data. System memory 404, removable storage 409 and non-removable storage 410 are all examples of non-transitory computer-readable storage mediums. Non-transitory computer readable storage mediums includes but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 400. Any such non-transitory computer-readable storage medium may be part of device 400. Computing device 400 may also have input device(s) 412 such as a keyboard, mouse, pen, voice input device, touch input device, etc. Output device(s) 414 such as a display, speakers, printer, etc. may also be included.

Computing device 400 also contains communication connection(s) 416 that allow the device to communicate with other computing devices 418, such as over a network or a wireless network. Communication connection(s) 416 is an example of communication media. Communication media may embody non-transitory computer readable instructions, data structures, program modules or other data in a modulated data signal such as a carrier wave or other transport mechanism and includes any information delivery media. The term "modulated data signal" may include a signal that has one or more of its characteristics set or changed in such a manner as to encode information in the signal. By way of example, and not limitation, communication media may include wired media such as a wired network or direct-wired connection, and wireless media such as acoustic, RF, infrared and other wireless media.

Figure 5:
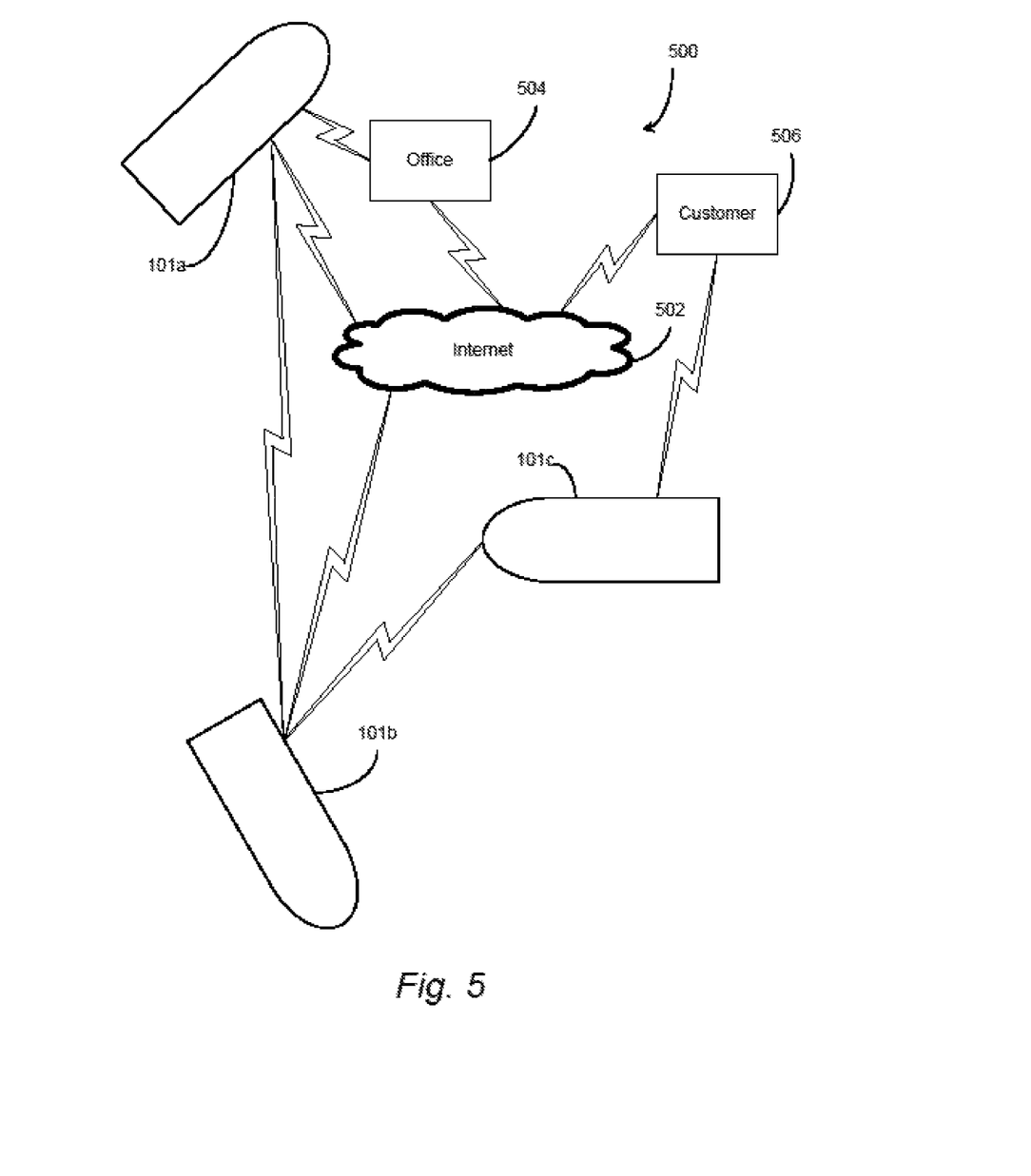
FIG. 5 represents an embodiment of network overviews for a weighing system.

FIG. 5 represents exemplary network overviews for the weighing system. Network overview 500 may include internet 502, one or more side loading WCVs 101, an office 504, and/or at least one customer 506. Side loading WCVs 101a, 101b, and 101c are depicted herein for exemplary purposes only. In one aspect, side loading WCVs 101 are owned by one company. In an alternative embodiment, the side loading WCVs 101 are owned by several different companies that work together. In another embodiment, the side loading WCVs 101 may include any combination of network connectivity, weighing, and recorded data. For example, a side loading WCV 101 may be connected to the internet 502 via wireless connectivity. In another embodiment, two or more side loading WCVs 101 may be networked together to exchange information via the internet 502, a radio frequency, and/or an infrared frequency. In one embodiment, a side loading WCV 101 may have no network connectivity, where features of the disclosure are locally facilitated. In other aspects, a side loading WCV 101 may use another side loading WCV 101 to network to the internet 502 or another side loading WCV 101 in a mesh network manner. In a further embodiment, the side loading WCV 101 may be connected to the office 504 or home computer system. In another embodiment, the side loading WCV 101 may communicate with customers 506 directly. These and any of the other myriad of network possibilities may be included to facilitate weight determination and data utilization.

The weight determination and association application 420 of the computer device 400 receives weights from a scale or weighing instrument located on the collection bin and/or the side loading waste collection vehicle 101. The weighing instrument, such as load cells, may be inside of the suspended collection bin 102, under the suspended collection bin 102, on the frame of the collection bin, inside pockets on a suspended collection bin 102, on the suspension mechanism, and/or on the robotic arm.

In one embodiment, the weighing instrument is located on the collection bin. In another embodiment, the weighing instrument is located underneath the tub and on the frame of a collection bin. In this embodiment the load cells can be separate from and/or attached to the collection bin. In one embodiment, the cells or a portion of the cells can be located on a frame of the hopper side loading waste collection vehicle. Further, the weighing instrument once attached to the collection bin may be removable. In another embodiment, once the weighing instrument is attached to the collection bin, the weighing system cannot be separated from the collection bin.

In an alternative embodiment, the weighing instrument, such as at least one load cell, is located on the suspension mechanism. In this embodiment, the load cells can be separate from and/or attached to the suspension mechanism. Further, the weighing instrument once attached to the suspension mechanism may be removable. In another embodiment, once the weighing instrument is attached to the suspension mechanism, the weighing system cannot be separated from the suspension mechanism.

In one embodiment, the weighing system is self-contained on the collection bin. In another embodiment, the entire weighing system is separate from the collection bin and located on the side loading waste collection vehicle 101. In a further embodiment, the weighing system is located on both the collection bin and the side loading waste collection vehicle 101. In yet another embodiment, the entire weighing system may come with the collection bin and have portions that attached to the side loading waste collection vehicle 101 for installation and use of the weighing system.

The weighing instrument may be any suitable device for weighing material, such as a load cell, strain gauge, and/or transducer. In one embodiment, the scale or weighing instrument is located inside of the suspended collection bin 102 and provides the interior floor of the bin. In another embodiment, the weighing instrument 108 has four load cells 608 located on a frame 604 underneath a tub 602 of a collection bin 102 as illustrated in FIG. 6. In one embodiment, the scale provides accurate weight measurements of within 5 pounds (2.268 kilograms) or less. In another embodiment, the scale provides accurate weight measurements of within 3 pounds (1.361 kilograms) or less. In a further embodiment, the scale provides accurate weight measurements of within 1 pound (0.4536 kilograms) or less. In an additional embodiment, the scale provides accurate weight measurements of within 0.50 pounds (0.2268 kilogram) or less. In another embodiment, the scale provides accurate weight measurements of within 0.1 pounds (0.0454 kilograms) or less.

The weighing instrument may be selectively activated or continuously active. The scale may continuously or selectively send weight to the weight determination and association application 420. The weight determination and association application 420 will account for any extra weight based on the varying configurations/locations of the scale. For instance, for scales located under the suspended collection bin 102 or on the suspension mechanism, the weight determination and association application 420 will subtract the weight of the suspended collection bin 102 and any other weight not provided by the collected material from the measurements. In one embodiment, the weight determination and association application 420 activates the scale 108 and/or determines when the scale sends taken weights. In another embodiment, the scale is activated and/or sends weights based on triggers, such as sensor information. The weight determination and association (WDA) application 420 associates each weight received with a specific identification. The identification may be entered by an operator or received electronically from another device.

In one embodiment, the scale is triggered by the movement of the robotic arm 106. This same trigger after a certain time period may activate the scale to send new weight information to the WDA application 420. In another embodiment, a trigger on the suspension mechanism may be utilized to reset the scale and/or the WDA application 420 to provide for proper calculation. In an additional embodiment, the operator may be able to use a trigger that activates the scale to weigh and/or send new weight information to the WDA application 420. Several of these triggers may further comprise timers that activate the scale to weigh or send new weight information after a determined amount of time. In one embodiment, the robotic arm may comprise a sensor, such as a mercury switch, tilt/angle sensor, inclinometer, and/or an accelerometer, for activating the scale or weighing instrument to weigh and/or to send new weight information. Any suitable mechanism or trigger for activating the scale to weigh and/or to send new weight information may be utilized by the WDA application 420 to activate the scale to weigh and send out data without departing from the scope and intent of the disclosure.

Further, any weight information received by the WDA application 420 is associated with a specific identification. The identification may include any necessary information for identifying the weight of the collected materials, such as date, time, route information, the side loading WCV 101 utilized for collection, address, waste container 110 number/information, and/or associated customer information.

The specific identification may be input by the operator or received from another device. The operator may input all information, a portion of the information, and/or update the information. The device may provide a portion of the information, all of the information, and/or update the information. The device may utilize a radio frequency identification system 300 (FIG. 3) and/or a global positioning system.

Figure 3:
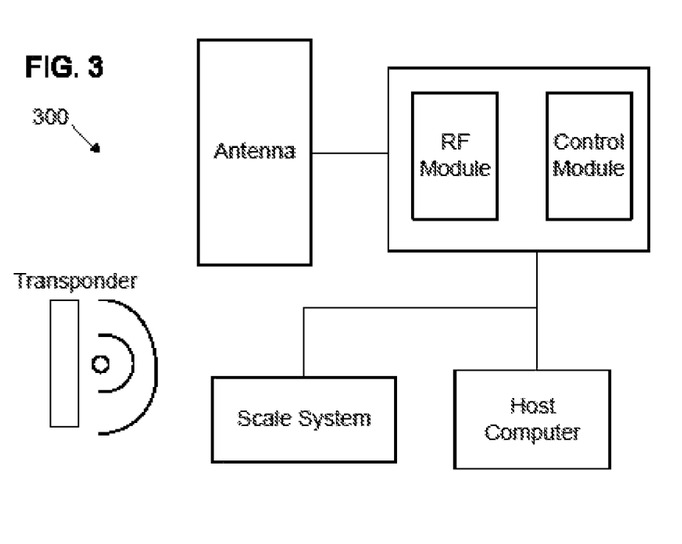
FIG. 3 is a diagram of a radio frequency identification system utilized with the collection and scale system of FIG. 1.

A radio frequency tag or transponder may be associated or attached to one or more waste containers. The tag may include information relating to the customer, route, location, address, date, and/or material. An antenna located on the side loading WCV 101 may read the information and then associate the weight taken when closest to this transponder with the appropriate customer information. The transponder and the antenna may be located in any suitable place for allowing the identification to be properly associated with the proper weights of the collected materials by the WDA application 420. In one embodiment, the information being associated with the taken weight may be displayed. An operator, in this embodiment, may be able to verify, update, or override the received RFID information to guarantee that the weight of the collected materials is associated with the correct information. One embodiment of an RFID system 300 is illustrated in FIG. 3.

The global positioning system may be utilized in a similar fashion to the RFID system 300 except that it utilizes microwave signals, satellites, and GPS receivers to perform the same function.

In one embodiment, the operator may have a button or method for recalculation. For instance, in a recyclables incentive program, the higher the weight of the recyclables the larger the incentive. Customers may inadvertently or purposely add non-recyclable materials to their waste container improperly increasing the weight of their collected recyclables. Because the operator can see if improper materials are added to the suspended collection bin, the operator may remove these improper or undesirable items from the collection. In this embodiment, after the removal of these items, the operator can trigger a recalculation. The recalculation deletes any improper weights taken and replaces the improper weight with the new correct weight. This embodiment allows the weighing system to maintain accurate readings after the removal of undesirable or improper materials.

Once the WDA application 420 receives weight information and associates the weights with the proper information, the WDA application 420 calculates other desired weights. In one embodiment, the WDA application 420 may be programmed to determined several different weights and weight combinations. The WDA application 420 may calculate the weight of the materials provided in each waste container 110 or dumping, per customer, per household, per area, per route, per side loading WCV 101, per a select number of side loading WCVs 101, per day, per month, or per year. The WDA application 420 may determine the weight of materials provided per waste container or dump by calculating the weight prior to dumping the waste container, calculating the weight after dumping and then finding the difference between the two calculated weights. The recalculation can be triggered by any number of mechanisms. The recalculation may be triggered manually by an operator, by a switch on the robotic arm, a GPS, and/or a radio frequency identification (RFID) system 300. Each calculation may be stored. Each calculation may be added into another calculation and stored. The desired data may be calculated by utilizing designed algorithms programmed.

Once the desired calculations have been obtained, these results can be stored or sent out. In one embodiment, the total collected material weight per customer may be sent to each customer and other parties. For instance, in a recycling incentive program the total collected weight of recyclables per customer may be sent to the customer and/or the company responsible for the incentives, so the customer and the program know the appropriate reward to be granted. In another embodiment, a state or city can reward whole communities for specific recycling habits with more funding if certain goals are met.

Figure 8:
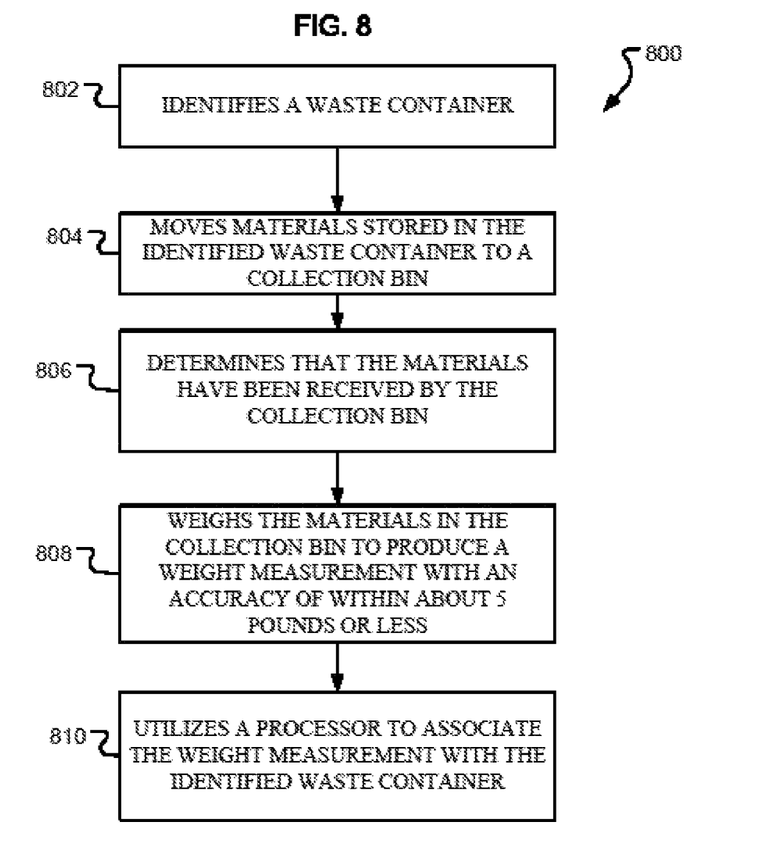
FIG. 8 illustrates an embodiment of a method for weighing materials in a collection bin for a side loading waste collection vehicle.

FIG. 8 represents an embodiment of a method for weighing materials collected in a collection bin for a side loading waste collection vehicle 800. As illustrated, method 800 identifies a waste container 802. In one embodiment, method 800 identifies the waste container manually. In another embodiment, method 800 utilizes and RFID system to identify the waste container. The side loading WCV may contain the RFID antenna and the waste container and RFID tag that is recognized by the antenna. The RFID tag may contain numerous information, such as owner name, owner address, waste container size, waste container number, and/or owner account number or may be an identifier that can be used to access such information from a database. In another embodiment, the location of the waste container is determined utilizing GPS. The location of the waste container and/or the side loading WCV may be stored and/or determined along with the other identifying information of the waste container.

As illustrated in FIG. 8, method 800 moves materials stored in the identified waste container to a collection bin 804. In one embodiment, the materials in the identified waste container may be manually placed into the collection. In another embodiment, the materials contained in the waste container are automatically moved into the collection bin. In one embodiment, an automated robotic arm is utilized to automatically move materials stored in a waste container to the collection bin.

Further, method 800 determines that the materials have been received by the collection bin 806. In one embodiment, method 800 manually determines that the materials have been received by the collection bin. In another embodiment, method 800 utilizes a sensor to determine that the materials have been received by the collection bin. Any suitable sensor for determining movement or weight change may be utilized by method 800. In one embodiment, a sensor is located on the sliding part of an automated robotic arm. In a further embodiment, a sensor is located on the rotating part of the robotic arm. In another embodiment, a sensor is located on the suspension mechanism of the side loading WCV. In an alternative embodiment, the operator visually determines that the material from the waste container is received by the collection bin.

Method 800 weighs the materials in the collection bin to produce a weight measurement with an accuracy of within about 5 pounds or less 808. In one embodiment, method 800 utilizes a load cell to determine the weight of the materials in the collection bin. In one embodiment, the weight measurement taken by method 800 is within at least one of about 1 pound or less, about 0.5 pounds or less, and about 0.1 pounds or less of the weight of the collected materials. In a further embodiment, method 800 utilizes the weight of the collection bin prior to receiving materials from a waste container and the weight of the collection bin after the step of determining that materials from the waste container have been received by the collection bin to generate the weight measurement of the materials found within the waste container.

Additionally, method 800 utilizes a processor to associate the weight measurement with the identified waste container 810. In yet another embodiment, method 800 stores the weight measurement in association with the identified waste container. In another embodiment, method 800 associates and stores other data associated with waste container with the weight measurement.

In one embodiment, method 800 utilizes a computer device and/or processor to calculate the weight measurement and to associate the weight measurement and/or other waste container related data with the identified waste container. Further, the computing device may further include a storage media for the grouped data. In one embodiment, the computing device also contains communication connection(s) that allow the device to communicate with other computing devices, such as over a network or a wireless network. By way of example, and not limitation, the communication media of the computing device may include wired media such as a wired network or direct-wired connection, and wireless media such as acoustic, RF, infrared and other wireless media.

In another embodiment, method 800 may group and add related weights and information stored in association with identified waste container for larger system analysis. For instance, the weights of the materials collected by one side loading WCV may be determined by method 800. In one example, the material collected for an entire geographic area may be calculated. In another embodiment, the time necessary for collecting material from a geographic area is calculated. In a further embodiment, the average weight of materials collected from one or multiple geographic areas may be calculated.

In another embodiment, method 800 displays the weight measurement with the identified waste container and/or any other related appropriate information. In another embodiment, method 800 displays calculations made by the grouping of related data. In one embodiment, the information is displayed on a monitor attached to the side loading waste collection vehicle. In another embodiment, the information is displayed on a monitor separate from the side loading waste collection vehicle, such as a personal computer or smart phone.

In an additional embodiment, method 800 identifies an undesirable object in the collection bin, removes the undesirable object from the collection bin, and recalculates the weight measurement after the removal of the undesirable object. An "undesirable object" as used herein is any object that should not be or was not intended to be collected and stored in the hopper of the side loading waste collection vehicle. In one embodiment, the operator in the cab of the WCV sees the material as it is dumped into the collection bin.

The operator may see undesirable objects in the collection bin and identify them as undesirable objects. In another embodiment, an operator outside of the side loading waste collection vehicle may see and identify the undesirable material as it is dumped into the collection bin. In another embodiment, a camera may display the items contained in the collection bin on a monitor to the operator. In this embodiment, the operator may identify undesirable objects placed in the collection bin by seeing the undesirable items on a display screen showing the contents of the collection bin. In one embodiment, these objects are manually removed from the collection bin. After the removal of the undesirable object, the operator can command the weighing system to recalculate the weight measurement removing the weight of the undesirable object.

Those skilled in the art will recognize that the methods and systems of the present disclosure may be implemented in many manners and as such are not to be limited by the foregoing exemplary embodiments and examples. In other words, functional elements being performed by a single or multiple components, in various combinations of hardware and software or firmware, and individual functions, can be distributed among software applications at either the client or server level or both. In this regard, any number of the features of the different embodiments described herein may be combined into single or multiple embodiments, and alternate embodiments having fewer than or more than all of the features herein described are possible. Functionality may also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, and those variations and modifications that may be made to the hardware or software or firmware components described herein as would be understood by those skilled in the art now and hereafter.

While various embodiments have been described, various changes and modifications may be made which are well within the scope of the present disclosure. For example, any number of sensors, computers, robotic arms, and/or weighing systems may be utilized, numerous other changes may be made which will readily suggest themselves to those skilled in the art and which are encompassed in the spirit of the disclosure and as defined in the appended claims.

The above specification provides a complete description of the present invention. Since many embodiments of the invention can be made without departing from the spirit and scope of the invention, certain aspects of the invention reside in the claims hereinafter appended.

What is claimed is:

1. A collection bin comprising:
   at least one suspension mechanism for attachment to a side loading waste collection vehicle;
   a processor;
   a weighing instrument controlled by the processor, the weighing instrument is adapted to weigh material disposed in the collection bin to produce weight measurements,
   wherein the processor associates the weight measurements with appropriate data; and
   an automated robotic arm attached to the collection bin, the automated robotic arm is adapted to empty material contained in a waste container into the collection bin.

2. A collection bin comprising:
   at least one suspension mechanism for attachment to a side loading waste collection vehicle;
   a processor;
   a weighing instrument controlled by the processor, the weighing instrument is adapted to weigh material disposed in the collection bin to produce weight measurements,
   wherein the processor associates the weight measurements with appropriate data;
   a frame, the frame comprising the suspension mechanism; and
   a tub, the tub held by the frame,
   wherein the weighing instrument is at least one load cell, the at least one load cell attached to the frame underneath the tub.

3. The collection bin of claim 2, wherein the weighing instrument provides for an accuracy of at least within about 5 pounds or less.

4. The collection bin of claim 2, further comprising:
   a RFID system controlled by the processor and adapted to at least identify waste containers; and
   a GPS system controlled by the processor and adapted to determine a location of at least one of the collection bin and waste containers.

5. The collection bin of claim 2, wherein the appropriate data includes at least one of a time a waste container is emptied into the collection bin, a date a waste container is emptied into the collection bin, a location of a waste container, a location of a waste container when emptied into the collection bin, an owner of a waste container, owner information for a waste container, waste container size, and previously taken weight measurements.

6. The collection bin of claim 2, wherein the weighing instrument is self-contained.

7. The collection bin of claim 2, further comprising at least one sensor in communication with the processor, the at least one sensor is adapted to determine at least one of movement or weight change.

8. The collection bin of claim 2, further comprising a GPRS system controlled by the processor.

9. The collection bin of claim 2, further comprising a GSM antenna controlled by the processor and a SIM card.

10. The collection bin of claim 2, further comprising a display controlled by the processor and an input device.

11. The collection bin of claim 2, further comprising a communication connection connected to the processor.

12. The collection bin of claim 2, wherein the processor further comprises a weight determination and association application controlled by the processor.

13. A collection and scale system, comprising:
    a side loading waste collection vehicle;
    a collection bin, the collection bin comprising a suspension mechanism for attachment to the side loading waste collection vehicle; and
    a weighing system, the weighing system is adapted to weigh material disposed in the collection bin to produce weight measurements and comprises
    at least one weighing instrument, and
    a processor,
    wherein the processor associates the weight measurements with appropriate data, and
    wherein the weighing instrument is attached to the collection bin.

14. A collection and scale system, comprising:
    a side loading waste collection vehicle;

a collection bin, the collection bin comprising a suspension mechanism for attachment to the side loading waste collection vehicle; and a weighing system, the weighing system is adapted to weigh material disposed in the collection bin to produce weight measurements and comprises at least one weighing instrument, and a processor, wherein the processor associates the weight measurements with appropriate data, and wherein the weighing system is self-contained on the collection bin.

15. A collection and scale system, comprising:

a side loading waste collection vehicle;

a collection bin, the collection bin comprising a suspension mechanism for attachment to the side loading waste collection vehicle; and a weighing system, the weighing system is adapted to weigh material disposed in the collection bin to produce weight measurements and comprises at least one weighing instrument, and a processor, wherein the processor associates the weight measurements with appropriate data, and wherein a portion of the weighing system is located on the side loading waste collection vehicle and a portion is located on the collection bin.

16. The collection bin of claim 2, wherein the weighing instrument provides for an accuracy of at least within about 1 pound or less.

17. The collection bin of claim 2, wherein the weighing instrument provides for an accuracy of at least within about 0.5 pounds or less.

18. The collection bin of claim 2, wherein the weighing instrument provides for an accuracy of at least within about 0.1 pounds or less.

* * * * *